(12) United States Patent
Inagaki et al.

(10) Patent No.: US 7,477,437 B1
(45) Date of Patent: Jan. 13, 2009

(54) LASER SCANNER

(75) Inventors: Yoshihiro Inagaki, Toyokawa (JP);
Makoto Ooki, Toyohashi (JP)

(73) Assignee: Konica Minolta Business Technologies, Inc., Chiyoda-Ku, Tokyo (JP)

( * ) Notice: Subject to any disclaimer, the term of this patent is extended or adjusted under 35 U.S.C. 154(b) by 0 days.

(21) Appl. No.: 11/964,209

(22) Filed: Dec. 26, 2007

(30) Foreign Application Priority Data
Aug. 10, 2007 (JP) .............................. 2007-208992

(51) Int. Cl.
*G02B 26/08* (2006.01)
(52) U.S. Cl. ...................................... 359/207; 359/215
(58) Field of Classification Search ................ 359/207, 359/215
See application file for complete search history.

(56) References Cited

U.S. PATENT DOCUMENTS 7,286,274 B2 * 10/2007 Mochizuki et al. .......... 359/204
7,345,801 B2 * 3/2008 Inagaki ....................... 359/205

FOREIGN PATENT DOCUMENTS

JP   2006-227044 (A)   8/2006
JP   2006-267878 (A)   10/2006

* cited by examiner

*Primary Examiner*—James Phan
(74) *Attorney, Agent, or Firm*—Buchanan Ingersoll & Rooney PC (57) ABSTRACT

In a main-scanning direction, light incident on a resonance mirror is convergent light and a first lens of a second optical system has a negative refractive power. Consequently, even with a small angle of deflection, the distance from the resonance mirror to a photoconductor required for obtaining a desired scanning width in the main-scanning direction can be reduced. Moreover, in a sub-scanning direction, light incident on the resonance mirror is parallel light, and the first lens of the second optical system has a negative refractive power and a second lens thereof has a positive refractive power. In addition, the first lens has both surfaces formed with a free curved surface and the second lens thereof also has a free curved surface. This permits keeping the sub-scanning magnification uniform, thus avoiding, even in high-speed drawing with a plurality of beams, image quality deterioration due a change in an interval in the sub-scanning direction between the plurality of beams.

8 Claims, 11 Drawing Sheets

LASER SCANNER

This application is based on Japanese Patent Application No. 2007-208992 filed on Aug. 10, 2007, the contents of which are hereby incorporated by reference.

BACKGROUND OF THE INVENTION

1. Field of the Invention

The present invention relates to a laser scanner.

2. Description of Related Art

Suggested in a conventional field of a laser scanner, for example, as shown in JP-A-2006-227044, is technology of deflecting, with a deflector (for example, resonance mirror), laser light transformed into convergent light in a main scanning direction and then condensing it onto a surface to be scanned with a scanning lens that has a negative refractive power (optical power) in the main-scanning direction and having arcsine property to thereby scan the surface to be scanned at a constant speed. As in JP-A-2006-227044, with configuration such that convergent light is made incident on the deflector in the main-scanning direction and the scanning lens has a negative refractive power in the main-scanning direction, even with a small angle of deflection by the deflector, the distance from the deflector to the surface to be scanned required for obtaining a desired scanning width in the main-scanning direction can be reduced, thus permitting downsizing of the device.

However, in a conventional laser scanner, in a case where the number of scanning lenses used is one, the sub-scanning magnification is not uniform in the main-scanning direction, thus causing, for example, upon high-speed drawing with a plurality of beams, a problem of deteriorated image quality due to a change in the interval in a sub-scanning direction between the plurality of beams (irradiation spots) depending on the position thereof on the surface to be scanned.

SUMMARY OF THE INVENTION

In view of the problem described above, the present invention has been made, and it is an object of the invention to provide a laser scanner capable of keeping the sub-scanning magnification in a main-scanning direction uniform to avoid image quality deterioration in high-speed drawing while achieving downsizing of the device.

According to one aspect of the invention, a laser scanner includes: a light source; a first optical system for converting light emitted from the light source into convergent light in a main-scanning direction and into parallel light in a sub-scanning direction; a deflector for deflecting the light from the first optical system by sinusoidally oscillating a reflection surface; and a second optical system for condensing the light deflected by the deflector onto a surface to be scanned both in the main-scanning direction and the sub-scanning direction and also scanning the surface to be scanned with the light in the main-scanning direction at a constant speed. The second optical system is composed of two lenses, a first lens arranged on a deflector side and a second lens arranged on a surface-to-be-scanned side. The first lens has a light incidence side surface and a light exit side surface both formed with a free curved surface, and has a negative refractive power in each of the main-scanning direction and the sub-scanning direction. The second lens has a free curved surface, and has a positive refractive power in the sub-scanning direction.

According to the invention, in the main-scanning direction, light incident on the deflector is convergent light and the first lens of the second optical system has a negative refractive power. This permits a reduction in the length of an optical path from the deflector to the surface to be scanned to thereby achieve downsizing of the device. Moreover, the second optical system can be provided with three free curved surfaces to thereby achieve uniform sub-scanning magnification. This therefore permits, for example, even by use of a plurality of beams, achieving high-speed drawing without image quality deterioration.

BRIEF DESCRIPTION OF THE DRAWINGS

The aforementioned objects and other objects of the present invention will be more clarified by referring to the following description of the preferred embodiments and also the accompanying drawings indicating the following.

DETAILED DESCRIPTION OF THE PREFERRED EMBODIMENTS

Figure 1:
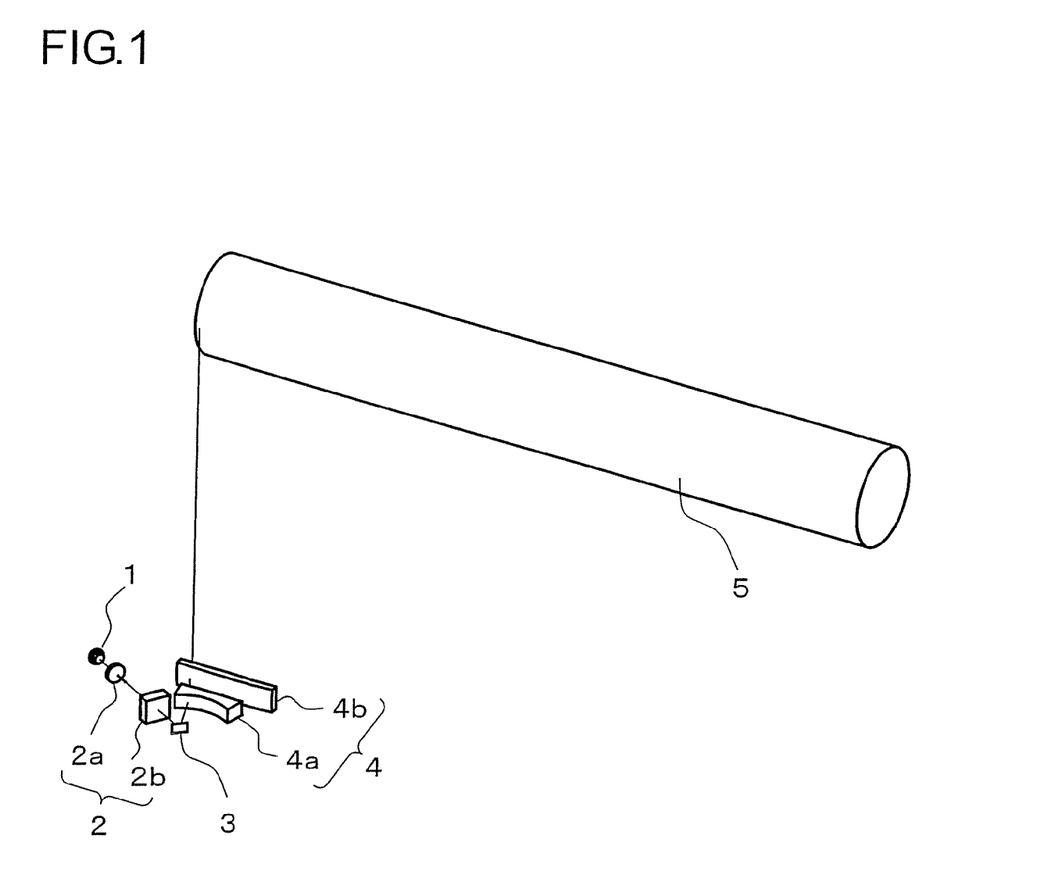
FIG. 1 is a perspective view showing schematic configuration of a laser scanner according to one embodiment of the invention.

One embodiment of the present invention will be described below, with reference to the accompanying drawings. FIG. 1 is a perspective view showing schematic configuration of a laser scanner according to this embodiment. This laser scanner has: a light source 1, a first optical system 2, a resonance mirror 3, a second optical system 4, and a photoconductor 5.

The light source 1 emits substantially linearly polarized laser light, and is formed of, for example, a semiconductor laser. In this embodiment, the light source 1 has a plurality of luminous points (see FIG. 7), thus permitting high-speed drawing with a plurality of beams.

The first optical system 2 is a condensing optical system that converts laser light from the light source 1 into convergent light in a main-scanning direction and into parallel light in a sub-scanning direction. This first optical system 2 is composed of two lenses, a collimator lens 2a arranged on a light source 1 side and a cylindrical lens 2b arranged on a resonance mirror 3 side. The collimator lens 2a converts laser light emitted from the light source 1 into parallel light and guides it to the cylindrical lens 2b. The cylindrical lens 2b has a positive refractive power in the main-scanning direction, and converges light from the collimator lens 2a in the main-scanning direction and then guides it to the resonance mirror 3.

The resonance mirror 3 is a deflector that deflects light from the first optical system 2 by sinusoidally oscillating a reflection surface, and is formed of, for example, a resonant scanner.

The second optical system 4 is a scanning optical system that condenses light deflected by the resonance mirror 3 onto the photoconductor 5 as the surface to be scanned in both the main-scanning direction and the sub-scanning direction. This second optical system 4 has arcsine property, and, even by using, as a deflector, the resonance mirror 3 whose reflection surface sinusoidally oscillates, can scan the photoconductor 5 in the main-scanning direction at a constant speed with light defected by the resonance mirror 3.

The second optical system 4 is composed of two lenses, a first lens 4a arranged on a resonance mirror 3 side and a second lens 4b arranged on a photoconductor 5 side. The first lens 4a has a light incidence side surface and a light exit side surface both formed with a free curved surface, and has a negative refractive power in each of the main-scanning direction and the sub-scanning direction. On the other hand, the second lens 4b, for example, has a light incidence side surface formed with a free curved surface, and has a positive refractive power in the sub-scanning direction.

With the above configuration, light emitted from the light source 1, after converted into parallel light by the collimator lens 2a of the first optical system 2, is converted into convergent light by the cylindrical lens 2b only in the main-scanning direction, and then is made incident on the resonance mirror 3. On the resonance mirror 3, light incident from the first optical system 2 is deflected in the main-scanning direction, and then condensed onto the photoconductor 5 via the second optical system 4. Hereinafter, details of such a laser scanner will be described with Examples 1 and 2. For Example 1, Comparative Example is also described.

Example 1

Figure 2:
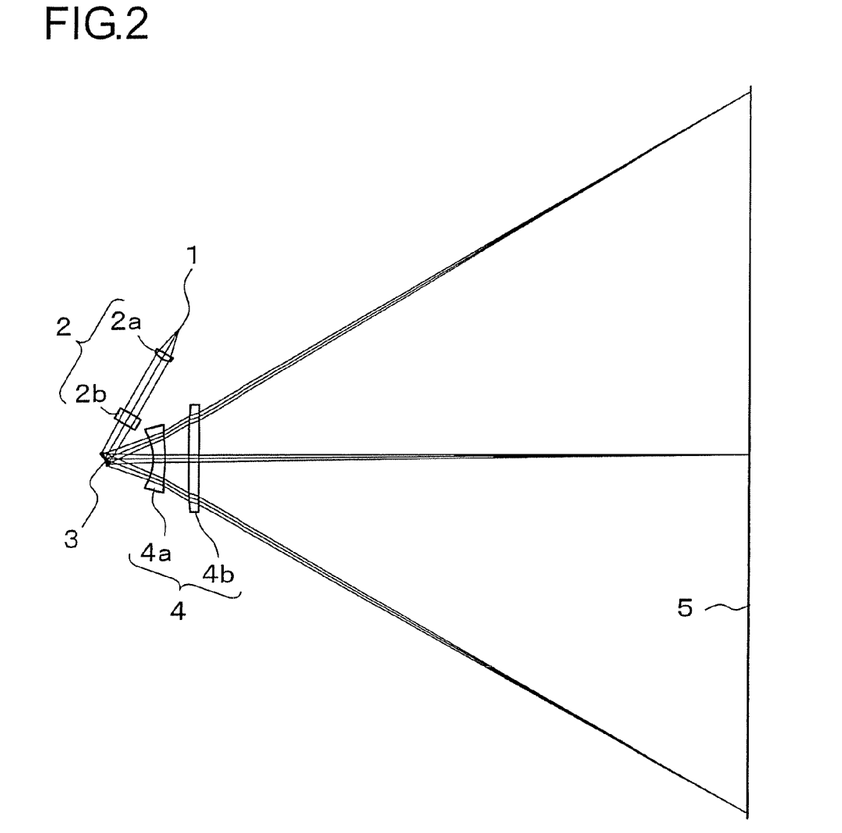
FIG. 2 is an illustrative diagram showing an optical path in a main scanning cross section of an entire laser scanner of Example 1.
Figure 3:
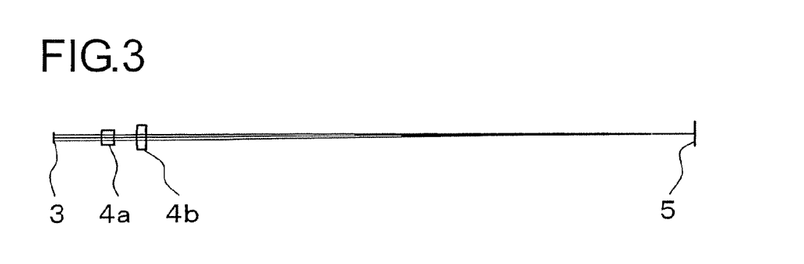
FIG. 3 is an illustrative diagram showing the optical path in a sub-scanning cross section from a resonance mirror to a photoconductor in the laser scanner.
Figure 4:
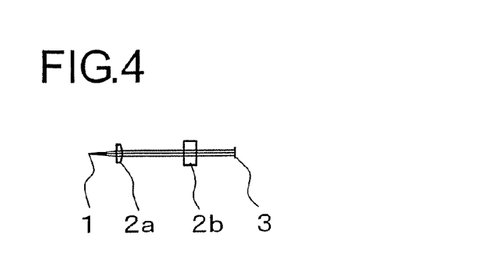
FIG. 4 is an illustrative diagram showing the optical path in the sub-scanning cross section from a light source to the resonance mirror in the laser scanner.

FIGS. 2 to 4 are optical path diagrams of a laser scanner according to Example 1. More specifically, FIG. 2 is an optical path diagram in the main-scanning cross section of the entire laser scanner. FIG. 3 is an optical path diagram showing the optical path in the sub-scanning cross section from the resonance mirror 3 to the photoconductor 5. FIG. 4 is an optical path diagram showing the optical path in the sub-scanning cross section from the light source 1 to the resonance mirror 3. In the main-scanning direction, light from the light source 1 turns to convergent light at the time when it is made incident on the resonance mirror 3.

Here, in configuration for making convergent light incident on the resonance mirror 3, on the upstream side of the resonance mirror 3, the width (width in the main-scanning direction) of a flux of light increases with an increasing distance from the resonance mirror 3. Thus, an optical element (for example, a lens) arranged upstream of the resonance mirror 3 is typically sized large, thus leading to cost increase. However, in this embodiment, the cylindrical lens 2b is arranged near the resonance mirror 3, and the collimator lens 2a is arranged upstream of the cylindrical lens 2b. Thus, light incident on the cylindrical lens 2b is parallel light and the width of a flux of light in the main-scanning direction is constant. Therefore, it is not required to upsize the collimator lens 2a, and convergent light can be generated and made incident on the resonance mirror 3 in the main-scanning direction without upsizing the first optical system 2, thus also avoiding cost increase of the optical elements.

Table 1 numerically shows coordinate data on optical surfaces of the optical systems of Example 1. This coordinate data shows arrangements of each of the optical surfaces (with respect to the surface vertex) with an origin and vectors of a local orthogonal coordinate system (x, y, z) in a global orthogonal coordinate system (X, Y, Z). The evaluated surface corresponds to the surface of the photoconductor 5.

TABLE 1

| Surface | Name | Local coordinate origin | | | Local coordinate X-axis vector | | | Local coordinate Y-axis vector | | |
|---|---|---|---|---|---|---|---|---|---|---|
| | | X | Y | Z | X | Y | Z | X | Y | Z |
| 1 | Collimator | 25.00 | 43.30 | 0.00 | −0.5000 | −0.8660 | 0.0000 | 0.8660 | −0.5000 | 0.0000 |
| 2 | lens | 23.75 | 41.14 | 0.00 | −0.5000 | −0.8660 | 0.0000 | 0.8660 | −0.5000 | 0.0000 |
| 3 | Cylindrical | 10.76 | 18.64 | 0.00 | −0.5000 | −0.8660 | 0.0000 | 0.8660 | −0.5000 | 0.0000 |

TABLE 1-continued

| Surface | Name | Local coordinate origin | | | Local coordinate X-axis vector | | | Local coordinate Y-axis vector | | |
|---|---|---|---|---|---|---|---|---|---|---|
| | | X | Y | Z | X | Y | Z | X | Y | Z |
| 4 | lens | 8.26 | 14.31 | 0.00 | −0.5000 | −0.8660 | 0.0000 | 0.8660 | −0.5000 | 0.0000 |
| 5 | Resonance mirror | 0.00 | 0.00 | 0.00 | −0.8660 | −0.5000 | 0.0000 | 0.5000 | −0.8660 | 0.0000 |
| 6 | Scanning lens 1 | 20.35 | 0.00 | 0.00 | 1.0000 | 0.0000 | 0.0000 | 0.0000 | 1.0000 | 0.0000 |
| 7 | | 25.35 | 0.00 | 0.00 | 1.0000 | 0.0000 | 0.0000 | 0.0000 | 1.0000 | 0.0000 |
| 8 | Scanning lens 2 | 35.00 | 0.00 | 0.00 | 1.0000 | 0.0000 | 0.0000 | 0.0000 | 1.0000 | 0.0000 |
| 9 | | 39.00 | 0.00 | 0.00 | 1.0000 | 0.0000 | 0.0000 | 0.0000 | 1.0000 | 0.0000 |
| 10 | Evaluated surface | 268.94 | 0.00 | 0.00 | 1.0000 | 0.0000 | 0.0000 | 0.0000 | 1.0000 | 0.0000 |

Surface numbers 1 to 10 in Table 1 respectively denote: a light incidence side surface and a light exit side surface of the collimator lens 2a of the first optical system 2; a light incidence side surface and a light exit side surface of the cylindrical lens 2b; a light reflection surface of the resonance mirror 3; a light incidence side surface and a light exit side surface of the first lens 4a (scanning lens 1) of the second optical system 4, a light incidence side surface and a light exit side surface of the second lens 4b (scanning lens 2), and the surface of the photoconductor 5. A Z-axis is an axis in the sub-scanning direction, a Y-axis is an axis in the main-scanning direction, and an X-axis is an axis perpendicular to the Y-Z plate. The coordinates of the resonance mirror 3 in the table refer to a case where an angle of deflection is 0 degrees.

Tables 2 to 7 show surface construction (surface shape) of the optical surfaces, where $E-n = \times 10^{-n}$.

TABLE 2

Surface 1: Spherical surface

| Curvature |
|---|
| 1.60399E−02 |

TABLE 3

Surface 2: Axisymmetric aspherical surface

| Order | Coefficient |
|---|---|
| 2 | −6.54340E−02 |
| 4 | −7.35182E−05 |
| 6 | −2.10008E−06 |
| 8 | 3.21455E−07 |
| 10 | −1.40878E−08 |

TABLE 4

Surface 3: Cylindrical surface

| Curvature in main-scanning cross section |
|---|
| 2.35771E−02 |

TABLE 5

Surface 6: Free curved surface

| i\j | 0 | 2 |
|---|---|---|
| 0 | 0.00000E+00 | 2.48257E−02 |
| 2 | −3.05694E−02 | 5.49840E−04 |
| 4 | 4.69320E−05 | −1.65084E−06 |
| 6 | 6.55242E−08 | −2.04168E−09 |
| 8 | −1.45426E−09 | −9.94817E−11 |
| 10 | 5.35748E−12 | 0.00000E+00 |

TABLE 6

Surface 7: Free curved surface

| i | 0 | 2 |
|---|---|---|
| 0 | 0.00000E+00 | 3.75501E−02 |
| 2 | −1.18890E−02 | 6.60657E−04 |
| 4 | 5.41551E−05 | −9.33141E−07 |
| 6 | −4.97489E−10 | −7.32171E−09 |
| 8 | −5.17161E−10 | −3.10477E−12 |
| 10 | 1.29513E−12 | 0.00000E+00 |

TABLE 7

Surface 8: Free curved surface

| i | 0 | 2 |
|---|---|---|
| 0 | 0.00000E+00 | 1.32125E−02 |
| 2 | −8.41937E−04 | 9.11234E−05 |
| 4 | 4.74312E−06 | −2.52860E−07 |
| 6 | 3.45809E−11 | 2.82782E−10 |
| 8 | −6.65731E−12 | −1.40623E−13 |
| 10 | 6.26252E−15 | 0.00000E+00 |

Here, the surface shape of a free curved surface (nonaxisymmetric surface) is expressed by formula 1 below, where $a_{ij}$ is a coefficient of the free curved surface.

$$x = \sum_{i=0}^{10} \sum_{j=0}^{2} a_{ij} y^i z^j \qquad \text{[Formula 1]}$$

The surface shape of an axisymmetric aspherical surface is expressed by formula 2 below, where $a_i$ denotes a coefficient of the aspherical surface.

$$x = \sum_{i=0}^{10} a_i \left(\sqrt{y^2 + z^2}\right)^i \quad \text{[Formula 2]}$$

Coefficients not shown in the tables are all 0

In Example 1, the collimator lens 2a of the first optical system 2 is an axisymmetric aspherical lens of glass, with the light incidence side surface thereof formed with a spherical surface and the light exit side surface thereof formed with an axisymmetric aspherical surface. The cylindrical lens 2b is one glass lens, with the light incidence side surface thereof formed with a cylinder surface. The first lens 4a of the second optical system 4 is formed of a nonaxisymmetric lens of resin, with both the light incidence side surface and the light exit side surface thereof formed with a free curved surface. The second lens 4b is formed of a nonaxisymmetric lens of resin, with the light incidence side surface thereof formed with a free curved surface. The wavelength used is 405 nm, and the refractive index in this condition is 1.530 for the glass described above and 1.547 for the resin described above.

Table 8 shows, in specific numerical values, refractive powers (optical powers in 1/mm) near the optical axes of the first lens 4a and the second lens 4b of the second optical system 4. For both the first lens 4a and the second lens 4b, the refractive power differs between in the main-scanning cross section and in the sub-scanning cross section. For the first lens 4a, the refractive power is negative both in the main-scanning cross section and in the sub-scanning cross section. For the second lens 4b, the refractive power is negative in the main-scanning cross section and positive in the sub-scanning cross section.

TABLE 8

| | In main-scanning cross section | In sub-scanning cross section |
|---|---|---|
| Scanning lens 1 | −0.01905 | −0.01032 |
| Scanning lens 2 | −0.00092 | 0.01447 |

Figure 5:
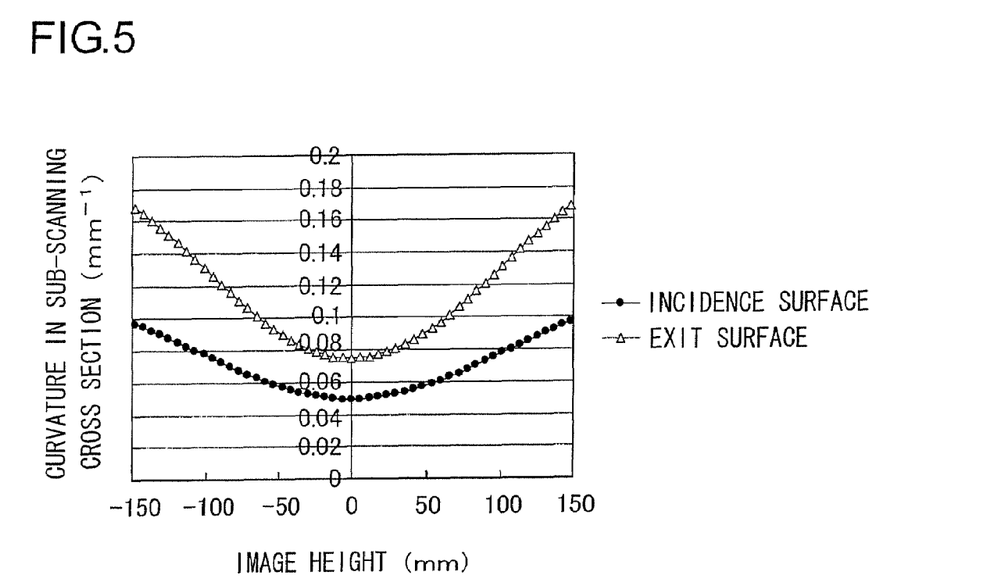
FIG. 5 is an illustrative diagram showing curvature change in the sub-scanning cross section on a first lens of a second optical system of the laser scanner.

FIG. 5 shows curvature change in the sub-scanning cross section on the first lens 4a of the second optical system 4. The horizontal axis denotes the image height on the photoconductor 5. The curvature in the sub-scanning cross section at the position where a principal ray of light is incident on the lens surface is calculated with an angle of deflection at which light reaches the image height. All the curvatures are positive in value, indicating that the first lens 4a has a meniscus shape convex toward the resonance mirror 3 in the sub-scanning cross section. Curvatures of both the light incidence side surface and the light exit side surface of the first lens 4a in the sub-scanning cross section increase in the direction from a portion corresponding to an image center to a portion corresponding to the image periphery This permits keeping the sub-scanning magnification uniform in the entire second optical system 4.

Figure 6:
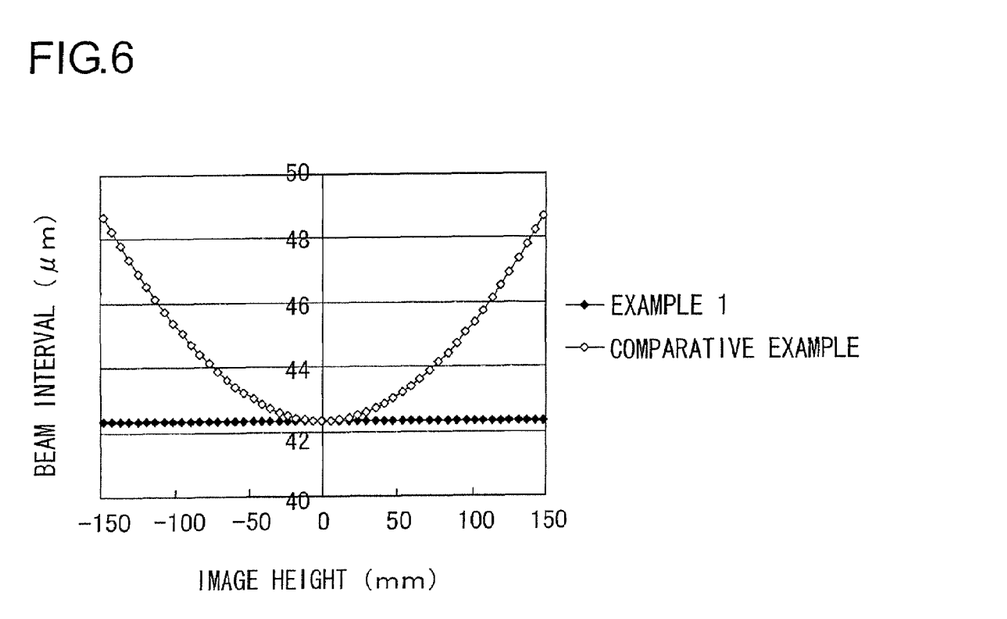
FIG. 6 is an illustrative diagram showing intervals in a sub-scanning direction between two beams (irradiation spots) on the photoconductor in Example 1 and Comparative Example.
Figure 7:
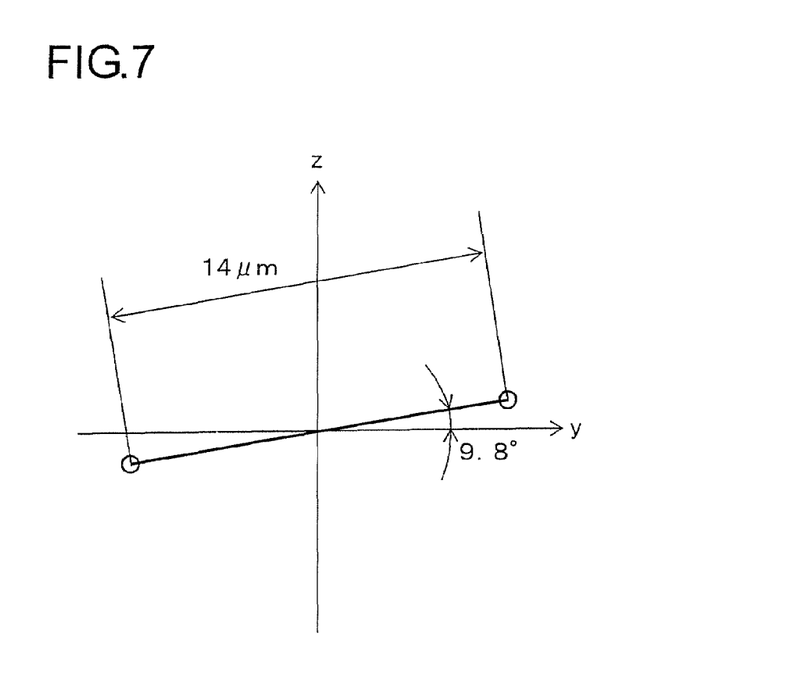
FIG. 7 is an illustrative diagram schematically showing a positional relationship between two luminous points when the light source is viewed from a collimator lens side in Example 1.

FIG. 6 shows an interval in the sub-scanning direction between two beams (irradiation spots) on the photoconductor 5 in Example 1 and Comparative Example. FIG. 7 schematically shows a positional relationship between two luminous points when the light source 1 is viewed from the collimator lens 2a side. In the light source 1, the two luminous points are located at an interval of 14 μm, and inclined to the periphery of the optical axis of the collimator lens 2a at an angle of 9.8 degrees with respect to a horizontal plane. When such a light source 1 is used in Example 1, the interval in the sub-scanning direction between the irradiation spots on the photoconductor 5 is 42.3 μm, as shown in FIG. 6.

Table 9 numerically shows coordinate data on optical surfaces of optical systems in Comparative Example. Tables 10 to 14 show surface construction (surface shapes) of the optical surfaces described above, where $E-n = \times 10^{-n}$.

TABLE 9

| | | Local coordinate origin | | | Local coordinate X-axis vector | | | Local coordinate Y-axis vector | | |
|---|---|---|---|---|---|---|---|---|---|---|
| Surface | Name | X | Y | Z | X | Y | Z | X | Y | Z |
| 1 | Collimator lens | 25.00 | 43.30 | 0.00 | −0.5000 | −0.8660 | 0.0000 | 0.8660 | −0.5000 | 0.0000 |
| 2 | | 23.75 | 41.14 | 0.00 | −0.5000 | −0.8660 | 0.0000 | 0.8660 | −0.5000 | 0.0000 |
| 3 | Cylindrical lens | 20.25 | 35.07 | 0.00 | −0.5000 | −0.8660 | 0.0000 | 0.8660 | −0.5000 | 0.0000 |
| 4 | | 13.59 | 23.55 | 0.00 | −0.5000 | −0.8660 | 0.0000 | 0.8660 | −0.5000 | 0.0000 |
| 5 | Resonance mirror | 0.00 | 0.00 | 0.00 | −0.8660 | −0.5000 | 0.0000 | 0.5000 | −0.8660 | 0.0000 |
| 6 | Scanning lens | 26.10 | 0.00 | 0.00 | 1.0000 | 0.0000 | 0.0000 | 0.0000 | 1.0000 | 0.0000 |
| 7 | | 31.10 | 0.00 | 0.00 | 1.0000 | 0.0000 | 0.0000 | 0.0000 | 1.0000 | 0.0000 |
| 8 | Evaluated surface | 286.51 | 0.00 | 0.00 | 1.0000 | 0.0000 | 0.0000 | 0.0000 | 1.0000 | 0.0000 |

TABLE 10

Surface 1: Spherical surface

Curvature 1.60399E−02

TABLE 11

Surface 2: Axisymmetric aspherical surface

| Order | Coefficient |
|---|---|
| 2 | −6.54340E−02 |
| 4 | −7.63671E−05 |
| 6 | −1.86934E−07 |
| 8 | 5.12092E−08 |
| 10 | −1.96145E−09 |

TABLE 12

Surface 3: Cylinder surface

Curvature in main-scanning cross section 1.45090E−02

TABLE 13

Surface 6: Free curved surface

| | j | |
|---|---|---|
| i | 0 | 2 |
| 0 | 0.00000E+00 | 6.29763E−03 |
| 2 | −1.37718E−02 | 2.05818E−05 |
| 4 | −1.98784E−06 | −5.15060E−08 |
| 6 | 1.49517E−09 | 7.56468E−11 |
| 8 | −2.41345E−11 | −1.03839E−13 |
| 10 | 7.10797E−14 | 0.00000E+00 |

TABLE 14

Surface 7: Free curved surface

| | j | |
|---|---|---|
| i | 0 | 2 |
| 0 | 0.00000E+00 | 3.84736E−03 |
| 2 | −3.04667E−03 | 1.61573E−05 |
| 4 | 1.80122E−06 | −4.56962E−08 |
| 6 | 4.93046E−11 | 7.61348E−11 |
| 8 | −6.59580E−12 | −8.03153E−14 |
| 10 | 1.47420E−14 | 0.00000E+00 |

Comparative Example is identical to Example 1 in that light incident on the resonance mirror 3 is convergent light in the main-scanning direction and parallel light in the sub-scanning direction, but is different from Example 1 in that the second optical system 4 is formed of one scanning lens. Both surfaces of the scanning lens in Comparative Example are free curved surfaces. According to FIG. 6, with the configuration in Comparative Example, the sub-scanning magnification cannot be kept uniform, proving that the beam interval in the sub-scanning direction increases from the image center to the periphery.

Figure 8:
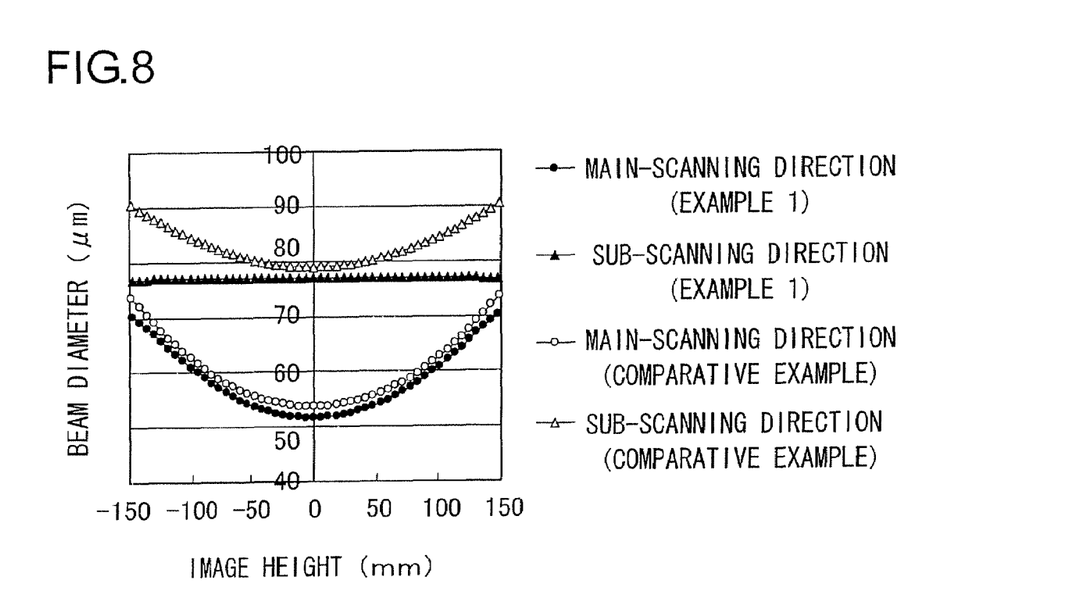
FIG. 8 is an illustrative diagram showing beam diameters in the main-scanning direction and the sub-scanning direction on the photoconductor in Example 1 and Comparative Example.

FIG. 8 shows beam diameters in the main-scanning direction and the sub-scanning direction on the photoconductor 5 in Example 1 and Comparative Example. The second optical system 4 of Example 1 has projection property such that it scans the photoconductor 5 at a constant speed with light deflected by the sinusoidally oscillating resonance mirror 3. The beam diameter in the main-scanning direction increases in the direction from the image center to the periphery, and thus is not constant. On the other hand, in the sub-scanning direction, the sub-scanning magnification can be kept uniform, and thus the beam diameter is also uniform. On the contrary, in Comparative Example, since the sub-scanning magnification is not uniform as described above, the beam diameter in the sub-scanning direction also increases at the image periphery. With Example 1, the beam diameter can be kept uniform, although only in the sub-scanning direction; thus, Example 1 is advantageous than Comparative Example in terms of image quality.

Figure 9:
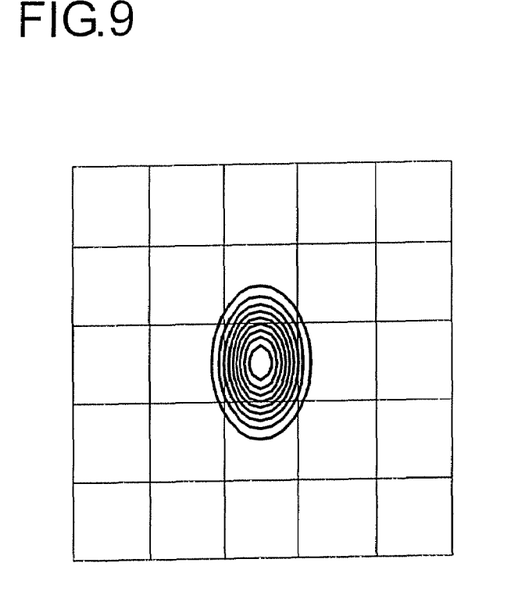
FIG. 9 is an illustrative diagram showing a beam shape at an image center in Example 1.
Figure 10:
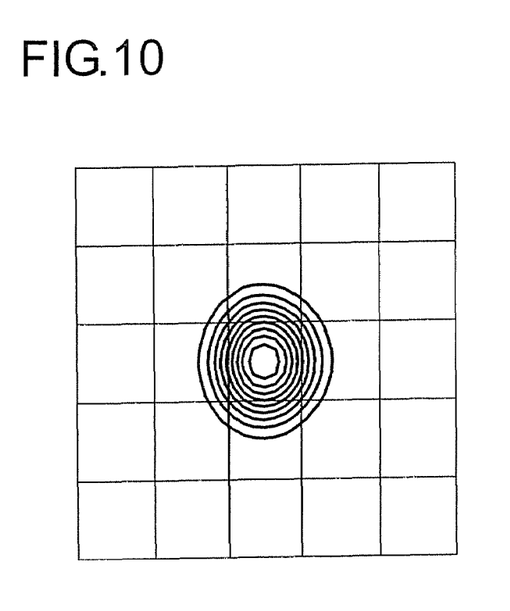
FIG. 10 is an illustrative diagram showing a beam shape at image periphery in Example 1.
Figure 11:
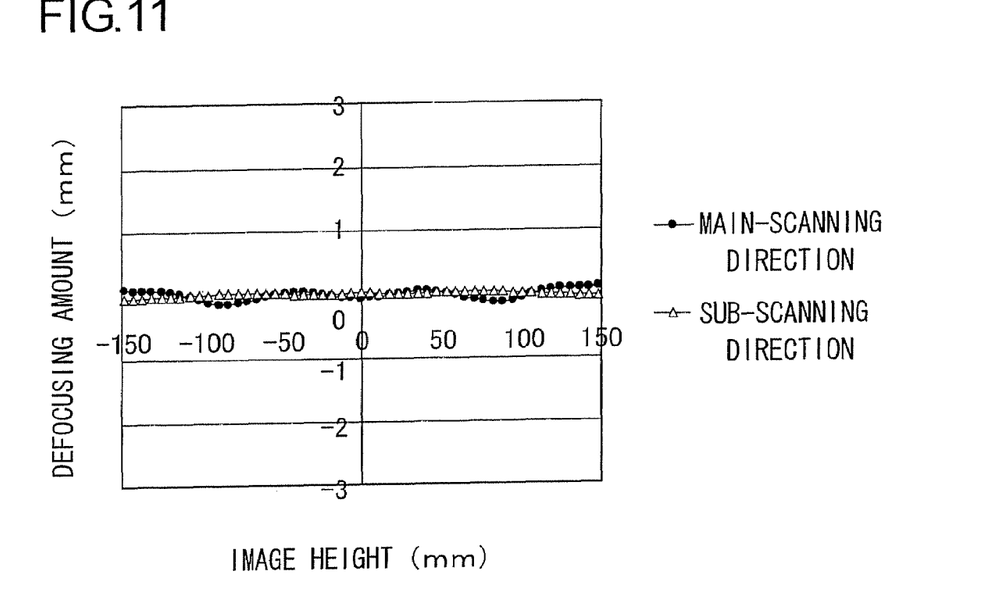
FIG. 11 is an illustrative diagram showing curvature of field in Example 1.

FIGS. 9 and 10 show beam shapes at the image center and the image periphery, respectively, in Example 1. In these figures, contour lines are plotted at intervals of 10% for respective peak intensities. FIGS. 9 and 10 demonstrate that the beam diameter in the sub-scanning direction (vertical direction in the figures) is uniform. FIG. 11 shows curvature of field in Example 1. This figure demonstrates that aberration is corrected satisfactorily.

Figure 12:
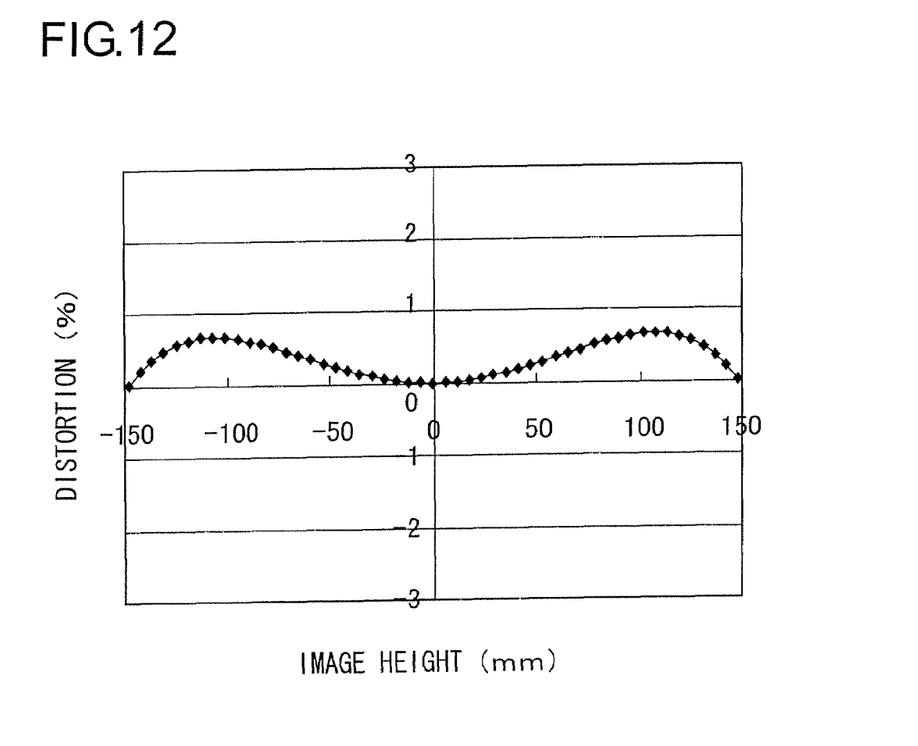
FIG. 12 is an illustrative diagram showing distortion in Example 1.

FIG. 12 shows distortion in Example 1. In this condition, the ideal image height is expressed by formula 3 below.

$$k \arcsin \frac{\theta}{\omega_{max}} \quad \text{[Formula 3]}$$

where k: denotes a calculated ideal image height coefficient;

θ: denotes an angle of deflection (in degrees); and

ωmax denotes a maximum angle of deflection (in degrees) including the range not used for drawing.

In Example 1, ωmax is 30 degrees, and k is approximately 189 obtained through calculation based on a change in the image height in response to a small change in the angle of deflection near an angle of deflection of 0 degrees.

When light incident on a deflector is parallel light, k is a value obtained by multiplying the focal length in the main-scanning cross section of the scanning optical system and a value of ωmax expressed in radian. The focal length in the main-scanning cross section of the scanning optical system in a case where the same k value as that of this embodiment is obtained when light incident on the deflector is parallel light is approximately 360 mm. In this condition, to shift the position of a main point far from the position of the scanning lens, it is required to use a combination of strong positive and negative powers. However, this makes aberration correction and manufacture difficult; thus, a value of length from the deflector to the photoconductor is larger than 360 mm. In Example 1, light made incident on the deflector is not parallel light but convergent light in the main-scanning direction, thus permitting a reduction in the distance from the deflector to the photoconductor down to approximately 269 mm. The distance from the position of incidence on the deflector to the position where light converges under the absence of the scanning lens after the deflection by the deflector is approximately 60 mm.

Example 2

Figure 13:
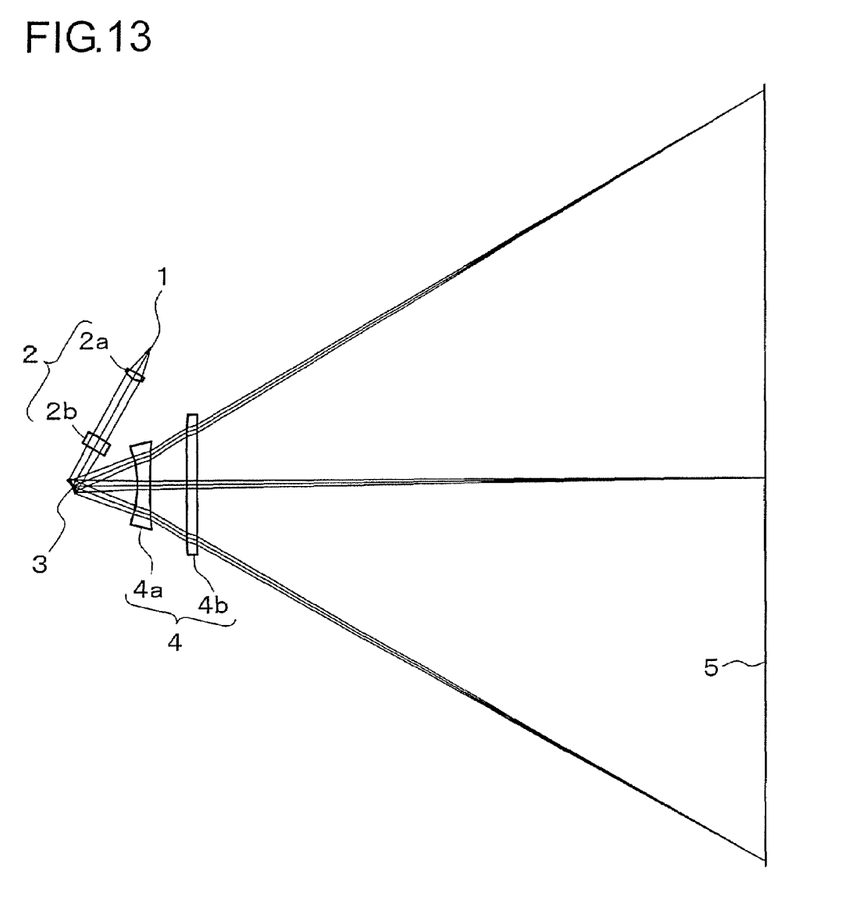
FIG. 13 is an illustrative diagram showing an optical path in a main-scanning cross section of an entire laser scanner of Example 2.
Figure 14:
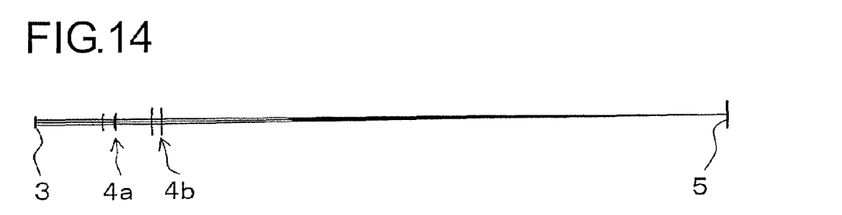
FIG. 14 is an illustrative diagram showing an optical path in a sub-scanning cross section from a resonance mirror to a photoconductor in the laser scanner.
Figure 15:
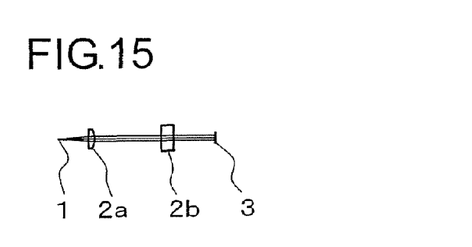
FIG. 15 is an illustrative diagram showing an optical path in the sub-scanning cross section from a light source to the resonance mirror in the laser scanner.

Next, a laser scanner of Example 2 will be described, FIGS. 13 to 15 are optical path diagrams of the laser scanner according to Example 2. More specifically, FIG. 13 is an optical path diagram in the main-scanning cross section of the entire laser scanner. FIG. 14 is an optical path diagram in the sub-scanning cross section from a resonance mirror 3 to a photoconductor 5. FIG. 15 is an optical path diagram in the sub-scanning cross section from a light source 1 to a resonance mirror 3. In FIG. 14, for a first lens 4a and a second lens 4b of a second optical system 4, only their light incidence side surfaces and light exit side surfaces are shown. Also in Example 2, in the main-scanning direction, light from the light source 1 turns into convergent light at the time when it is made incident on the resonance mirror 3.

Table 15 numerically shows coordinate data on optical surfaces of optical systems of Example 2.

TABLE 15

| Surface | Name | Local coordinate origin | | | Local coordinate X-axis vector | | | Local coordinate Y-axis vector | | |
|---|---|---|---|---|---|---|---|---|---|---|
| | | X | Y | Z | X | Y | Z | X | Y | Z |
| 1 | Collimator | 25.00 | 43.30 | 0.00 | −0.5000 | −0.8660 | 0.0000 | 0.8660 | −0.5000 | 0.0000 |
| 2 | lens | 23.75 | 41.14 | 0.00 | −0.5000 | −0.8660 | 0.0000 | 0.8660 | −0.5000 | 0.0000 |
| 3 | Cylindrical | 10.70 | 18.54 | 0.00 | −0.5000 | −0.8660 | 0.0000 | 0.8660 | −0.5000 | 0.0000 |
| 4 | lens | 8.20 | 14.21 | 0.00 | −0.5000 | −0.8660 | 0.0000 | 0.8660 | −0.5000 | 0.0000 |
| 5 | Resonance mirror | 0.00 | 0.00 | 0.00 | −0.8660 | −0.5000 | 0.0000 | 0.5000 | −0.8660 | 0.0000 |
| 6 | Scanning lens | 25.52 | 0.00 | 0.00 | 1.0000 | 0.0000 | 0.0000 | 0.0000 | 1.0000 | 0.0000 |
| 7 | 1 | 30.52 | 0.00 | 0.00 | 1.0000 | 0.0000 | 0.0000 | 0.0000 | 1.0000 | 0.0000 |
| 8 | Scanning lens | 45.00 | 0.00 | 0.00 | 1.0000 | 0.0000 | 0.0000 | 0.0000 | 1.0000 | 0.0000 |
| 9 | 2 | 49.00 | 0.00 | 0.00 | 1.0000 | 0.0000 | 0.0000 | 0.0000 | 1.0000 | 0.0000 |
| 10 | Evaluated surface | 271.47 | 0.00 | 0.00 | 1.0000 | 0.0000 | 0.0000 | 0.0000 | 1.0000 | 0.0000 |

Tables 16 to 21 show surface construction (surface shapes) of the optical surfaces, where $E-n = \times 10^{-n}$.

TABLE 16

Surface 1: Spherical surface

| Curvature |
|---|
| 1.60399E−02 |

TABLE 17

Surface 2: Axisymmetric aspherical surface

| Order | Coefficient |
|---|---|
| 2 | −6.54340E−02 |
| 4 | −7.82799E−05 |
| 6 | 2.19674E−08 |
| 8 | 2.67781E−08 |
| 10 | −1.01195E−09 |

TABLE 18

Surface 3: Cylinder surface

| Curvature in main-scanning cross section |
|---|
| 1.88617E−02 |

TABLE 19

Surface 6: Free curved surface

| i | 0 | 2 |
|---|---|---|
| 0 | 0.00000E+00 | 3.69415E−02 |
| 2 | −1.36432E−02 | 2.76293E−04 |
| 4 | 3.02764E−05 | −5.69532E−07 |
| 6 | −2.53712E−07 | 1.67219E−09 |
| 8 | 8.25724E−10 | 1.00794E−11 |
| 10 | −6.18373E−13 | 0.00000E+00 |

TABLE 20

Surface 7: Free curved surface

| i | 0 | 2 |
|---|---|---|
| 0 | 0.00000E+00 | 4.99162E−02 |
| 2 | −1.48382E−03 | 3.84989E−04 |
| 4 | 3.72392E−05 | −4.26044E−07 |
| 6 | −2.06456E−07 | 5.24480E−10 |
| 8 | 5.86930E−10 | 5.87485E−12 |
| 10 | −6.14830E−13 | 0.00000E+00 |

TABLE 21

Surface 8: Free curved surface

| i | 0 | 2 |
|---|---|---|
| 0 | 0.00000E+00 | 1.06636E−02 |
| 2 | −9.42412E−04 | 3.91029E−05 |
| 4 | 4.82346E−06 | −5.14526E−08 |
| 6 | −7.63939E−09 | 3.38823E−11 |
| 8 | 7.19794E−12 | −9.66116E−15 |
| 10 | −2.59390E−15 | 0.00000E+00 |

All coefficients not shown in the tables are 0.

Table 22 shows, in specific numerical values, refractive powers near optical axes of the first lens 4a and second lens 4b of the second optical system 4. For both the first lens 4a and the second lens 4b, the refractive power differs between in the main-scanning cross section and in the sub-scanning cross section. For the first lens 4a, the refractive power is negative both in the main-scanning cross section and in the sub-scanning cross section, For the second lens 4b, the refractive power in negative in the main-scanning cross section and positive in the sub-scanning cross section.

TABLE 22

| | In main-scanning cross section | In sub-scanning cross section |
|---|---|---|
| Scanning lens 1 | −0.01324 | −0.00706 |
| Scanning lens 2 | −0.00103 | 0.01168 |

Figure 16:
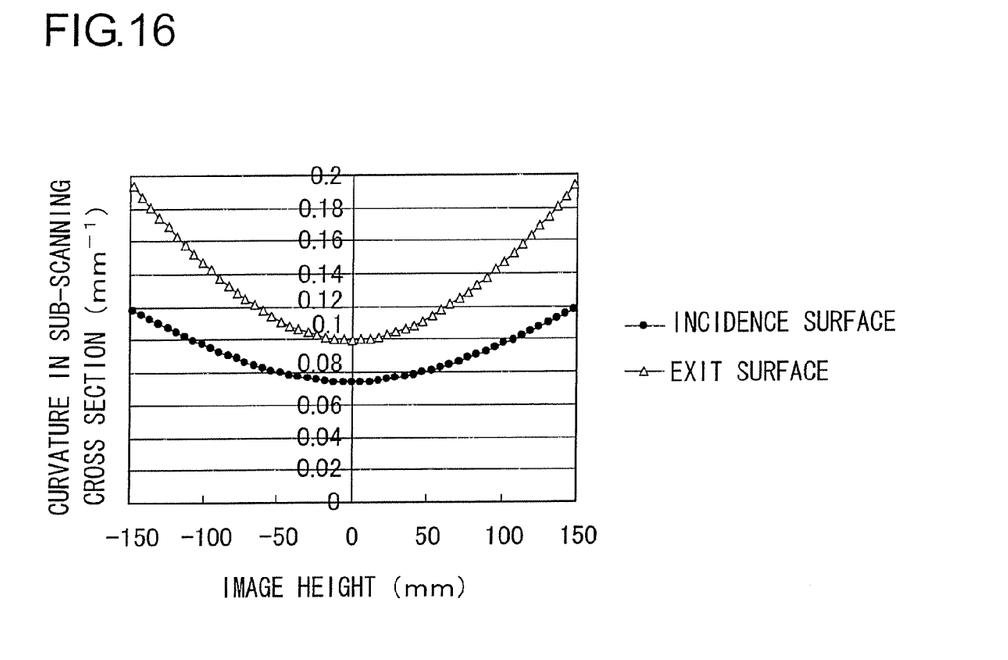
FIG. 16 is an illustrative diagram showing curvature change in the sub-scanning cross section on a first lens of a second optical system of the laser scanner.
Figure 17:
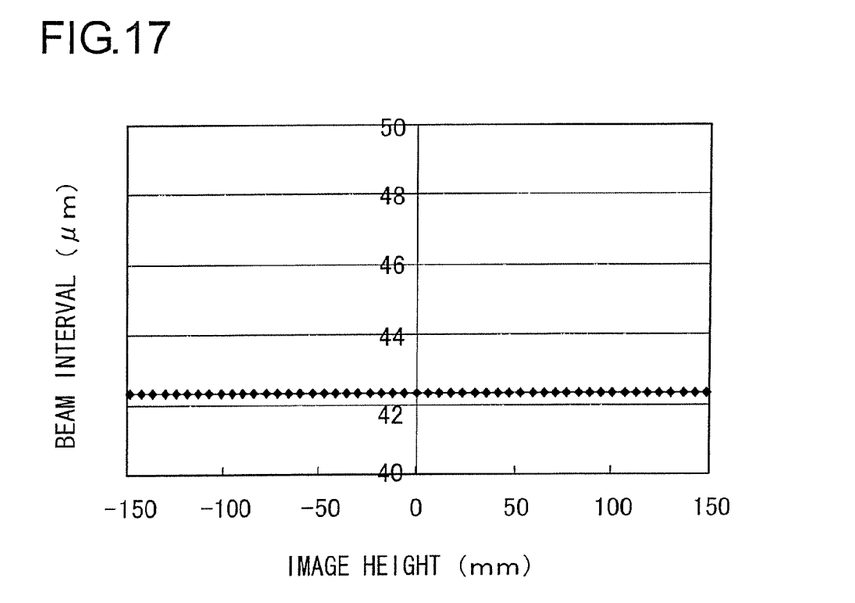
FIG. 17 is an illustrative diagram showing an interval in a sub-scanning direction between two beams (irradiation spots) on the photoconductor.

FIG. 16 shows curvature change in the sub-scanning cross section on the first lens 4a of the second optical system 4 in Example 2. FIG. 17 shows an interval in the sub-scanning direction between two beams (irradiation spots) on the photoconductor 5 in Example 2. As in Example 1, the interval in the sub-scanning direction between the irradiation spots on the photoconductor 5 is constant (for example, 42.3 µm).

Figure 18:
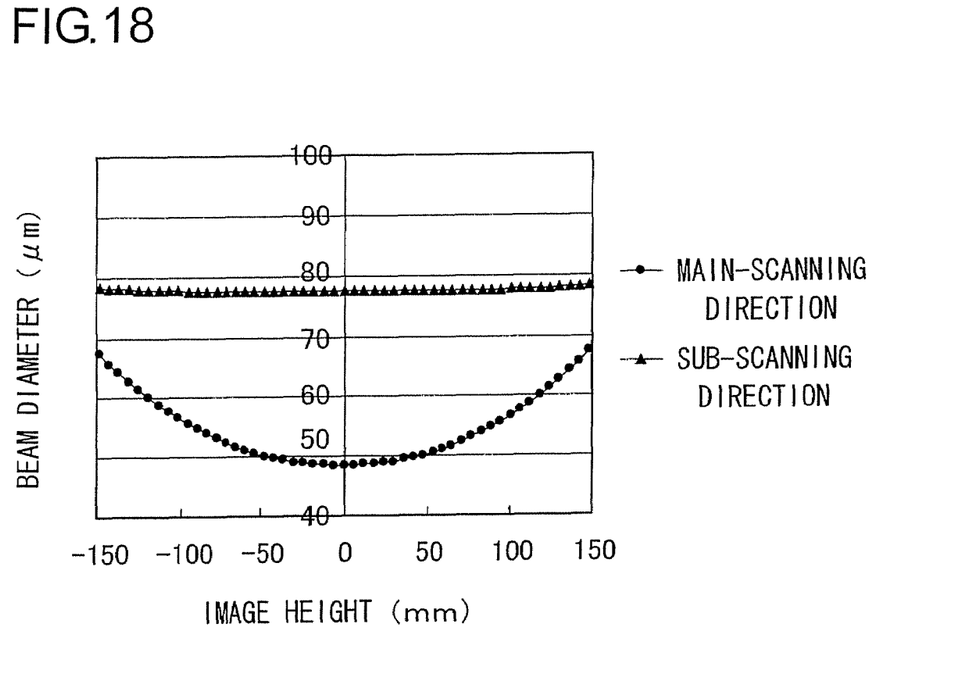
FIG. 18 is an illustrative diagram showing beam diameters in a main-scanning direction and the sub-scanning direction on the photoconductor.

FIG. 18 shows beam diameters in the main-scanning direction and the sub-scanning direction on the photoconductor 5. As in Example 1, the beam diameter in the sub-scanning direction is uniform.

Figure 19:
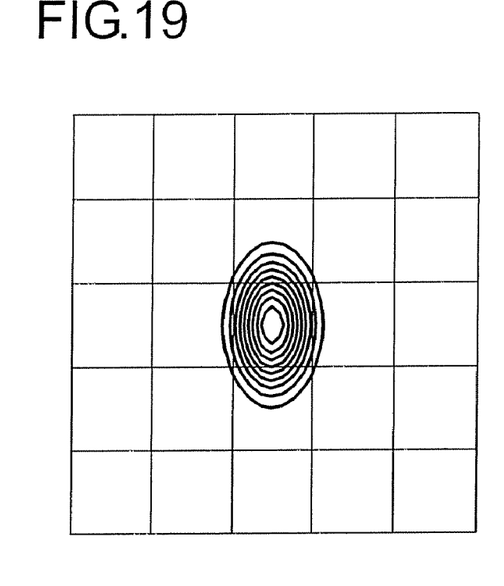
FIG. 19 is an illustrative diagram showing a beam shape at an image center in Example 2.
Figure 20:
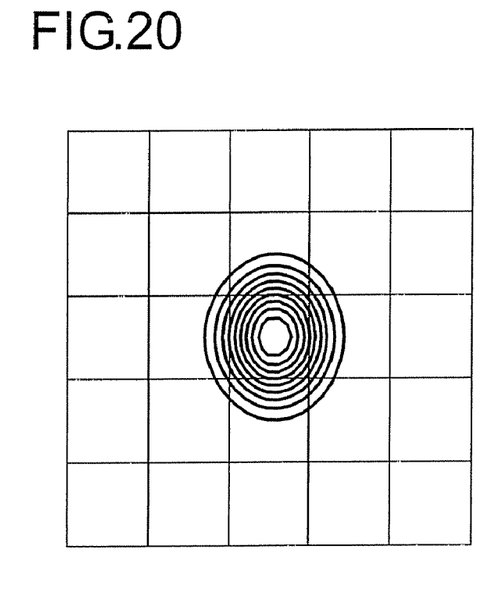
FIG. 20 is an illustrative diagram showing a beam shape at image periphery in Example 2.
Figure 21:
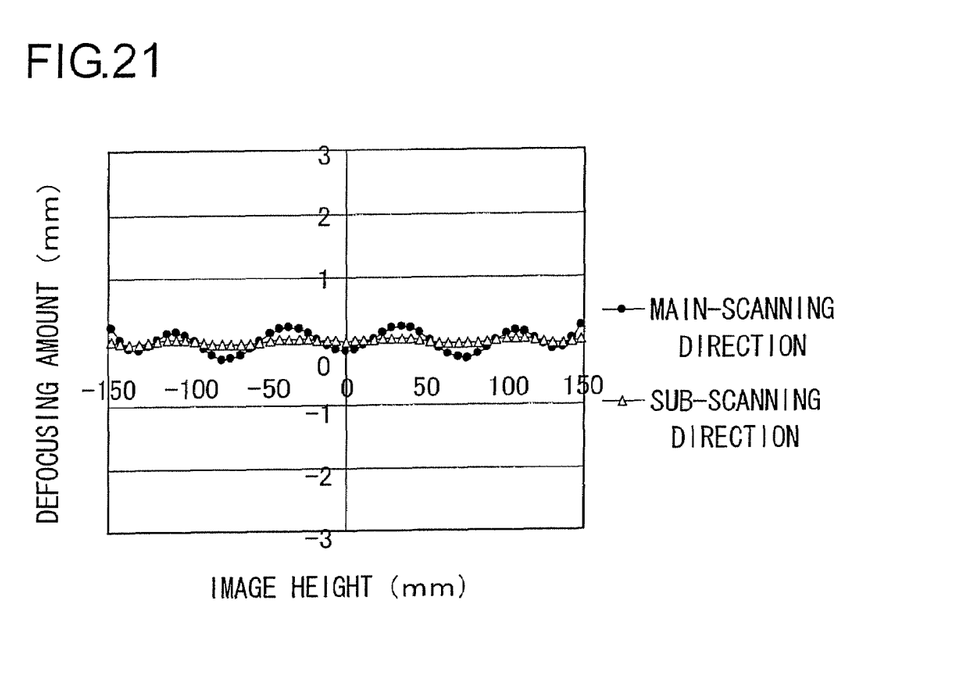
FIG. 21 is an illustrative diagram showing curvature of field in Example 2.

FIGS. 19 and 20 show beam shapes at the image center and the image periphery, respectively, in Example 2. In these figures, contour lines are plotted at intervals of 10% for respective peak intensities. FIGS. 19 and 20 demonstrate that the beam diameter in the sub-scanning direction (vertical direction in the figures) is uniform, FIG. 21 shows curvature of field in Example 2. This figure demonstrates that aberration is corrected satisfactorily.

Figure 22:
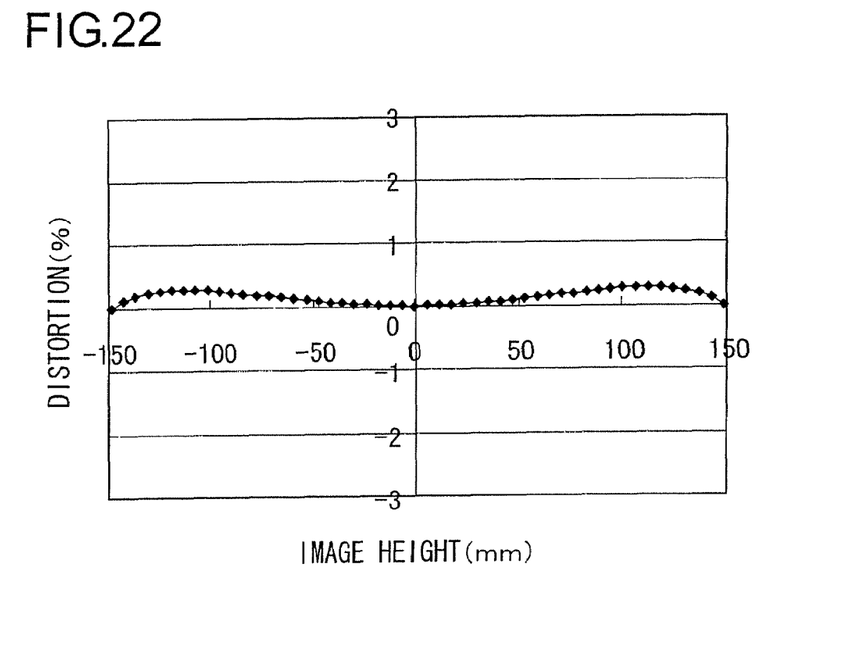
FIG. 22 is an illustrative diagram showing distortion in Example 2.

FIG. 22 shows distortion in Example 2. In Example 2, the distance from the position of incidence on the deflector to the position where light converges under the absence of scanning lens after the deflection by the deflector is approximately 80 mm.

As described in Examples 1 and 2 above, in the laser scanner of the invention, in the main-scanning direction, light incident on the resonance mirror 3 is convergent light and the refractive power of the first lens 4a of the second optical system 4 is negative. Consequently, even with a small angle of deflection on the resonance mirror 3, the distance from the resonance mirror 3 to the photoconductor 5 required for obtaining a desired scanning width in the main-scanning direction can be reduced, thus permitting downsizing of the device.

In the sub-scanning direction, light incident on the resonance mirror 3 is parallel light and the refractive power is negative for the first lens 4a of the second optical system 4 and positive for the second lens 4b thereof. In addition, the second optical system 4 has three free curved surfaces. This permits keeping constant the sub-scanning magnification in the main-scanning direction while maintaining favorable focusing performance. As a result, this, even in a case high-speed drawing with a plurality of beams is performed by use of the one having a plurality of luminous points as the light source 1, avoids image quality deterioration due to a change in the interval in the sub-scanning direction between a plurality of beams (irradiation spots) on the photoconductor 5.

The invention is applicable to, for example, a digital copier and a laser printer.

The laser scanner of the invention can also be expressed as follows, thus exerting the following effect.

The laser scanner of the invention may include a light source (for emitting laser light), a first optical system for converting light from the light source into convergent light in a main-scanning direction and into parallel light in a sub-scanning direction; a deflector for deflecting the light from the first optical system by sinusoidally oscillating a reflection surface; and a second optical system for condensing the light deflected by the deflector onto a surface to be scanned both in the main-scanning direction and the sub-scanning direction and also scanning the surface to be scanned with the light in the main-scanning direction at a constant speed. The second optical system may be composed of two lenses, a first lens arranged on a deflector side (that is, near the deflector) and a second lens arranged on a surface-to-be-scanned side (that is, near the surface to be scanned). The first lens may have a light incidence side surface and a light exit side surface both formed with a free curved surface and may have a negative refractive power in each of the main-scanning direction and the sub-scanning direction. The second lens may have a free curved surface and may have a positive refractive power in the sub-scanning direction.

With the configuration described above, light from the light source is made incident on the deflector (for example, resonance mirror) via the first optical system and deflected on the deflector, and then condensed onto the surface to be scanned (for example, photoconductor) both in the main-scanning direction and the sub-scanning direction via the second optical system (first lens and second lens). This second optical system permits scanning the surface to be scanned in the main-scanning direction at a constant speed even by use of a defector of a type that has a sinusoidally oscillating reflection surface.

Here, in the main-scanning direction, light incident on the deflector is convergent light and the first lens of the second optical system has a negative refractive power. Consequently, even with a small angle of deflection on the deflector, the distance from the deflector to the surface to be scanned required for obtaining a desired scanning width in the main-scanning direction can be reduced, thus permitting downsizing of the device.

On the other hand, in the sub-scanning direction, light incident on the deflector is parallel light and the first lens of the second optical system has a negative refractive power while the second lens thereof has a positive refractive power. Moreover, the first lens has a light incidence side surface and a light exit side surface both formed with a free curved surface, and the second lens also has a free curved surface.

As described above, in the sub-scanning direction, by making parallel light incident on the deflector, setting the refractive powers of the first lens and the second lens as described above, and using three free curved surfaces, the sub-scanning magnification can be kept uniform in the main-scanning direction while achieving downsizing of the device as described above. This consequently, even in a case high-speed drawing with a plurality of beams is performed by use of the one having a plurality of luminous points as the light source, can avoid image quality deterioration due to a change in the interval in the sub-scanning direction between a plurality of beams on the surface to be scanned.

In the laser scanner of the invention, the light source may have a plurality of luminous points. In this case, high-speed drawing with a multibeam can be achieved without image quality deterioration.

In the laser scanner of the invention, it is preferable that a shape of the first lens in a sub-scanning cross section be a meniscus shape convex toward the deflector side, and curvatures, in the sub-scanning cross section, of the light incidence side surface and the light exit side surface thereof both become larger from a portion corresponding to an image center toward a portion corresponding to image periphery. In this case, the sub-scanning magnification in the main-scanning direction can be reliably kept uniform.

In the laser scanner of the invention, the first optical system may be composed of a collimator lens for converting light emitted from the light source into parallel light and a cylindrical lens having a positive refractive power in the main-scanning direction and converging light from the collimator lens in the main-scanning direction. With this configuration, convergent light can be generated and made incident on the deflector in the main-scanning direction without upsizing the first optical system.

Based on the description above, it is obvious that various modifications can be made to the invention. Therefore, it should be understood that the invention is implemented within the scope of claims without sticking to any detailed description.

What is claimed is:

1. A laser scanner comprising:
   a light source;
   a first optical system for converting light emitted from the light source into convergent light in a main-scanning direction and into parallel light in a sub-scanning direction;
   a deflector for deflecting the light from the first optical system by sinusoidally oscillating a reflection surface; and
   a second optical system for condensing the light deflected by the deflector onto a surface to be scanned both in the main-scanning direction and the sub-scanning direction and also scanning the surface to be scanned with the light in the main-scanning direction at a constant speed,
   wherein the second optical system is composed of two lenses, a first lens arranged on a deflector side and a second lens arranged on a surface-to-be-scanned side, and
   wherein the first lens has a light incidence side surface and a light exit side surface both formed with a free curved surface, and has a negative refractive power in each of the main-scanning direction and the sub-scanning direction, and
   wherein the second lens has a free curved surface, and has a positive refractive power in the sub-scanning direction.

2. The laser scanner according to claim 1, wherein the light source has a plurality of luminous points.

3. The laser scanner according to claim 1, wherein a shape of the first lens in a sub-scanning cross section is a meniscus shape convex toward the deflector, and
   wherein curvatures, in the sub-scanning cross section, of the light incidence side surface and the light exit side surface of the first lens both become larger from a portion corresponding to an image center toward a portion corresponding to image periphery.

4. The laser scanner according to claim 1, wherein the first optical system has a collimator lens converting light emitted from the light source into parallel light and a cylindrical lens having a positive refractive power and converging light from the collimator lens in the main-scanning direction.

5. The laser scanner according to claim 1, wherein a number of free-curved surfaces included in the second optical system is three.

6. The laser scanner according to claim 1, wherein a light incidence side surface of the second lens is a free curved surface.

7. The laser scanner according to claim 1, wherein the second lens has a negative refractive power in the main-scanning direction.

8. The laser scanner according to claim 1, wherein the deflector is a resonance mirror.

* * * * *